C. ALLEN.
AUTOMATIC SEPARATING DEVICE.
APPLICATION FILED JULY 3, 1917.
1,254,562. Patented Jan. 22, 1918.
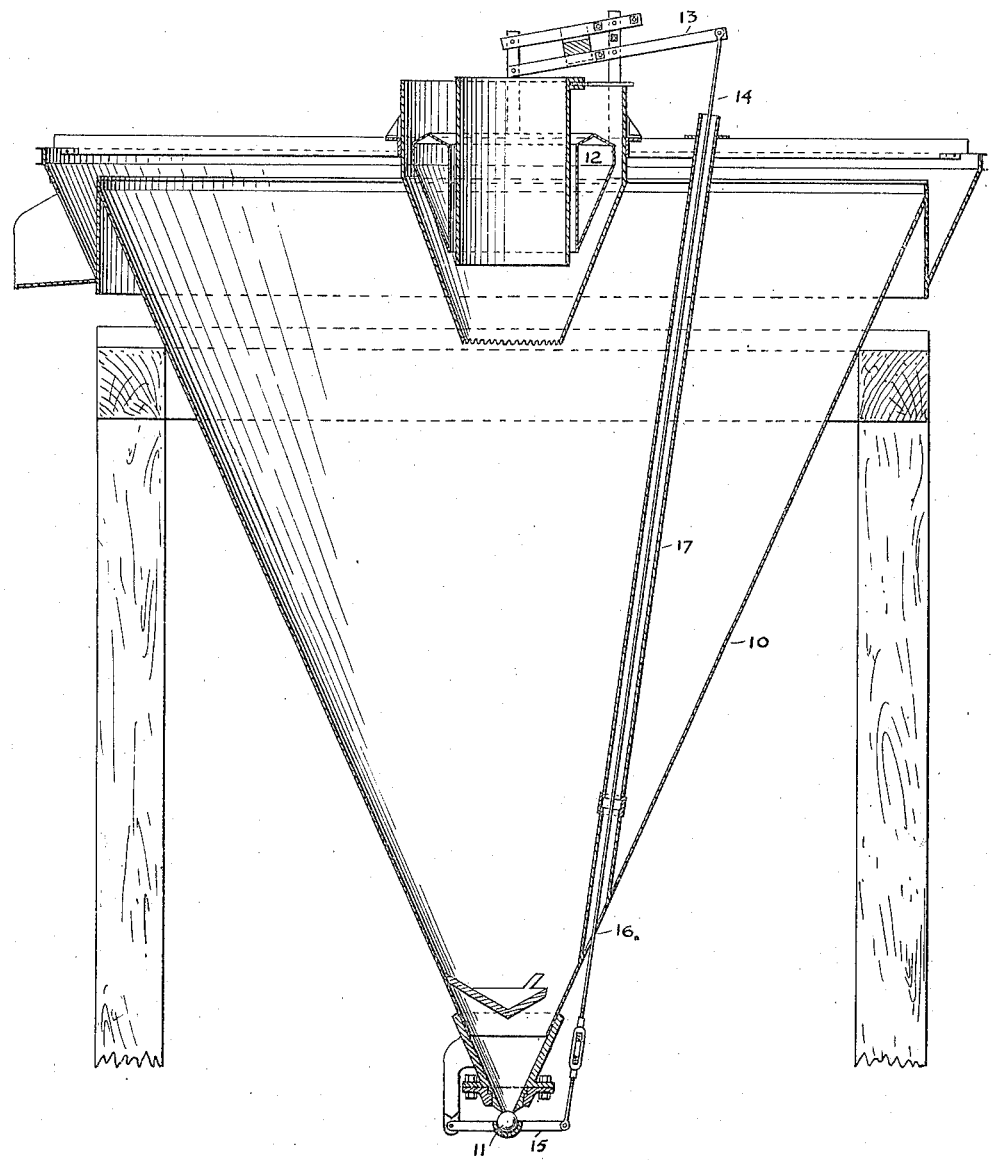
WITNESSES:
Thos. Castberg
Julius C. Benesch
INVENTOR
CHAS. ALLEN
BY Strong & Townsend
ATTORNEYS

UNITED STATES PATENT OFFICE.

CHARLES ALLEN, OF EL PASO, TEXAS.

AUTOMATIC SEPARATING DEVICE.

1,254,562.  Specification of Letters Patent.  Patented Jan. 22, 1918.

Application filed July 3, 1917. Serial No. 178,348.

*To all whom it may concern:*

Be it known that I, CHARLES ALLEN, a citizen of the United States, residing at El Paso, in the county of El Paso and State of Texas, have invented new and useful Improvements in Automatic Separating Devices, of which the following is a specification.

This invention relates to automatic separators and classifiers of the type shown and described in my Patent No. 1,147,356, dated July 20th, 1915.

In such devices a link connects a float lever at the top of the tank with a valve handle at the bottom thereof, and hitherto has been placed on the outside of the tank. If the tank is of a large size and the link be still placed on the outside, the float lever must be made so long as to become unyielding and cumbersome and a different length lever is required for each size of tank. The present invention aims to overcome these objections and permit the use of a float lever of the same length in different sized tanks. This is accomplished by placing an open-ended casing inside of the tank through which the link extends, such casing being positioned at the proper distance from the center of the tank and being so arranged as to prevent leakage of any of the material from the tank.

One form which my invention may assume is exemplified in the following description and illustrated in the accompanying drawing, in which—

The figure shows a vertical, central, sectional view of a device embodying my invention.

Only so much of the device as is necessary to the understanding of the invention will be described. An inverted cone-shaped tank 10 receives the material to be separated and has a discharge orifice at its apex controlled by a valve 11. A float 12 is arranged at the top of the tank for controlling the valve, being connected thereto by means of a lever 13 extending outwardly, to which is connected a link 14 extending downwardly and connecting in turn to a handle 15 which raises and lowers the valve.

In using large sized tanks it is impractical, as above pointed out, to make the lever 13 of such length that the link 14 may be positioned outside of the cone as in the case of my prior patent referred to. Hence I project the link 14 downwardly within the tank and have it extend through an opening 16 in the side of the tank near the bottom thereof and provide an open-ended casing or pipe 17 soldered or otherwise secured to the side of the tank around the opening 16 and extending upwardly to a point above the top of the tank where it is preferably held in place by means of fasteners 18 secured to a cross-bar 19 on top of the tank. This pipe or casing may be positioned a definite distance from the center of the tank so that the lever 15 may be of one length and still be applicable to different sized tanks. By the arrangement here shown a pack joint at the point where the link extends through the tank is not necessary and there is no danger of leakage.

Various changes in the construction and arrangement of the several parts herein shown and described may be employed without departing from the spirit of my invention as disclosed in the appended claims.

Having thus described my invention, what I claim and desire to secure by Letters Patent is—

1. In an automatic separator, a settling tank having a valve controlled discharge orifice at its bottom, a float arranged near the top of the tank for controlling the valve, and connections between the float and valve including a link extending downwardly within the tank and projecting through an opening in the tank near the bottom thereof, and a housing for said link secured to the wall of the tank around said opening and extending above the top of the tank.

2. In an automatic separator, an inverted, cone-shaped settling tank having a valve controlled discharge orifice at its apex, a float arranged near the top of the tank for controlling said valve, connections between the float and valve comprising a lever for the float, a link connected to the lever and extending downwardly within the tank and passing through an opening in the wall of the tank near the bottom thereof, a connection between the lower link and the valve on the exterior of the tank, and a pipe housing said link secured to the wall of the tank around said opening and projecting above the top of the tank.

3. In an automatic separator, an inverted, cone-shaped settling tank having a valve controlled discharge orifice at its apex, a float arranged near the top of the tank for controlling the valve, actuating means for the valve located exteriorly of the tank, and an operating connection extending from said actuating means upwardly through the side of the tank to said float.

In testimony whereof I have hereunto set my hand in the presence of two subscribing witnesses.

CHARLES ALLEN.

Witnesses:
ELDRED V. ANSPACH,
W O. MOORE.

Copies of this patent may be obtained for five cents each, by addressing the "Commissioner of Patents, Washington, D. C."